United States Patent

[11] 3,533,422

| [72] | Inventor | Constantin Alimanestiano |
| | | Chicago, Illinois |
| [21] | Appl. No. | 641,875 |
| [22] | Filed | May 29, 1967 |
| [45] | Patented | Oct. 13, 1970 |
| [73] | Assignee | Washindrive International Corporation |
| | | Chicago, Illinois |
| | | a corporation of Illinois |

[54] AUTOMATIC VEHICLE WASHING MECHANISM
17 Claims, 21 Drawing Figs.

[52] U.S. Cl. ............................................... 134/45,
134/57, 239/291
[51] Int. Cl. ....................................................... B60s 3/04
[50] Field of Search ......................................... 134/45,
123, 57; 15/(CCP digest); 239/291

[56] References Cited
UNITED STATES PATENTS

| 1,682,902 | 9/1928 | Gibson | 134/45 |
| 2,321,983 | 6/1943 | Brackett | 15/(CCP)UX |
| 3,127,764 | 4/1964 | Hudson | 239/291X |
| 3,187,359 | 6/1965 | Takeuchi | 134/123X |
| 3,361,143 | 1/1968 | Daum et al. | 134/45 |
| 3,410,284 | 11/1968 | Burger | 134/123X |

FOREIGN PATENTS
| 1,434,676 | 2/1966 | France | 15/(CCP)UX |

Primary Examiner—Robert L. Bleutge
Attorney—Olson, Trexler, Wolters and Bushnell

ABSTRACT: Automatic vehicle washing mechanism wherein a plurality of sensor units, such as photoelectric cells, are used to sense the contour of a vehicle and to control vertical and horizontal movement of a source of fluid which follows a path substantially similar to the sensed contour of the vehicle to wash the vehicle.

Patented Oct. 13, 1970

Inventor
Constantin Atimanestiano

By Olson, Trexler, Wolters & Bushnell Attys

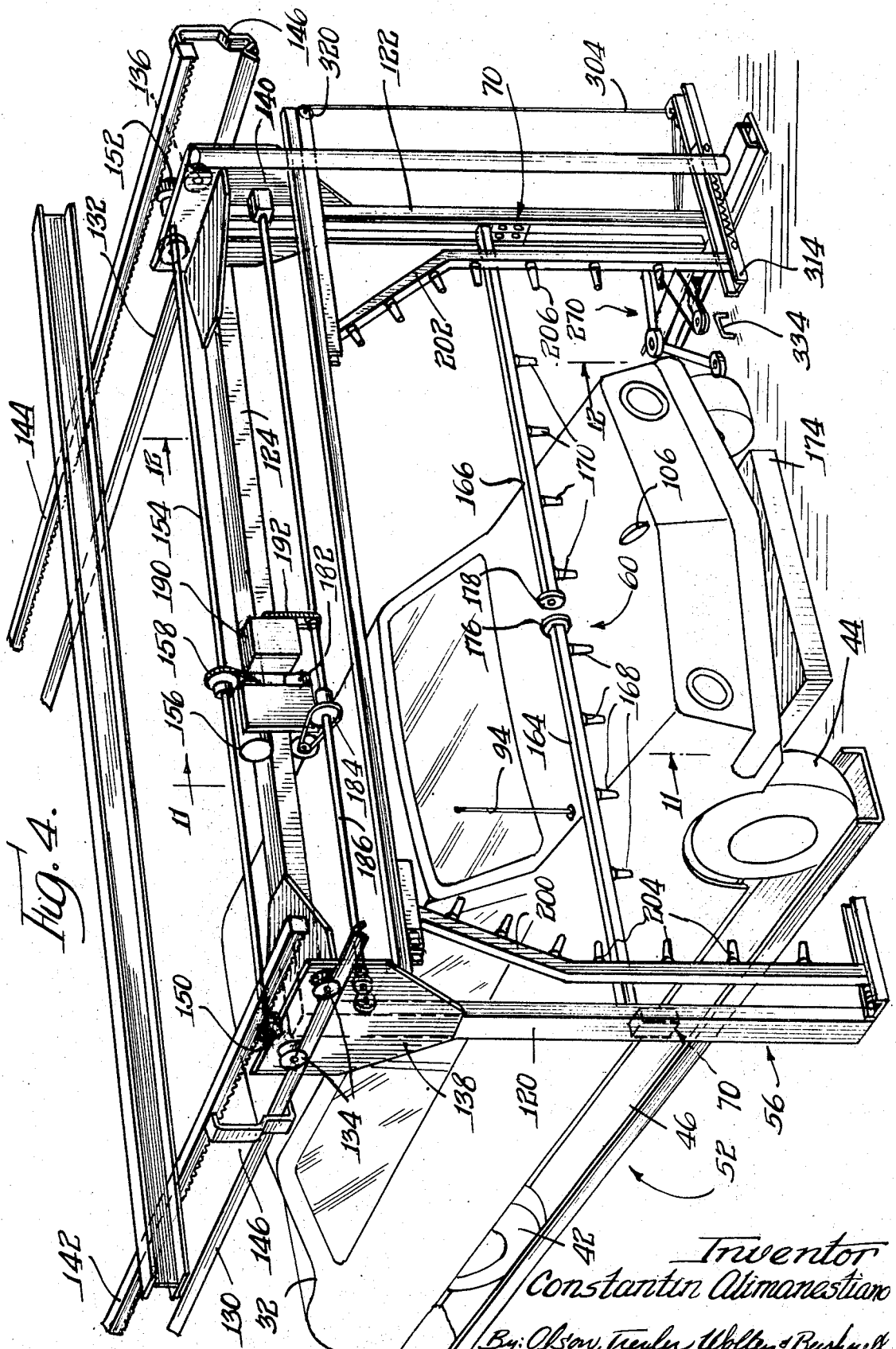

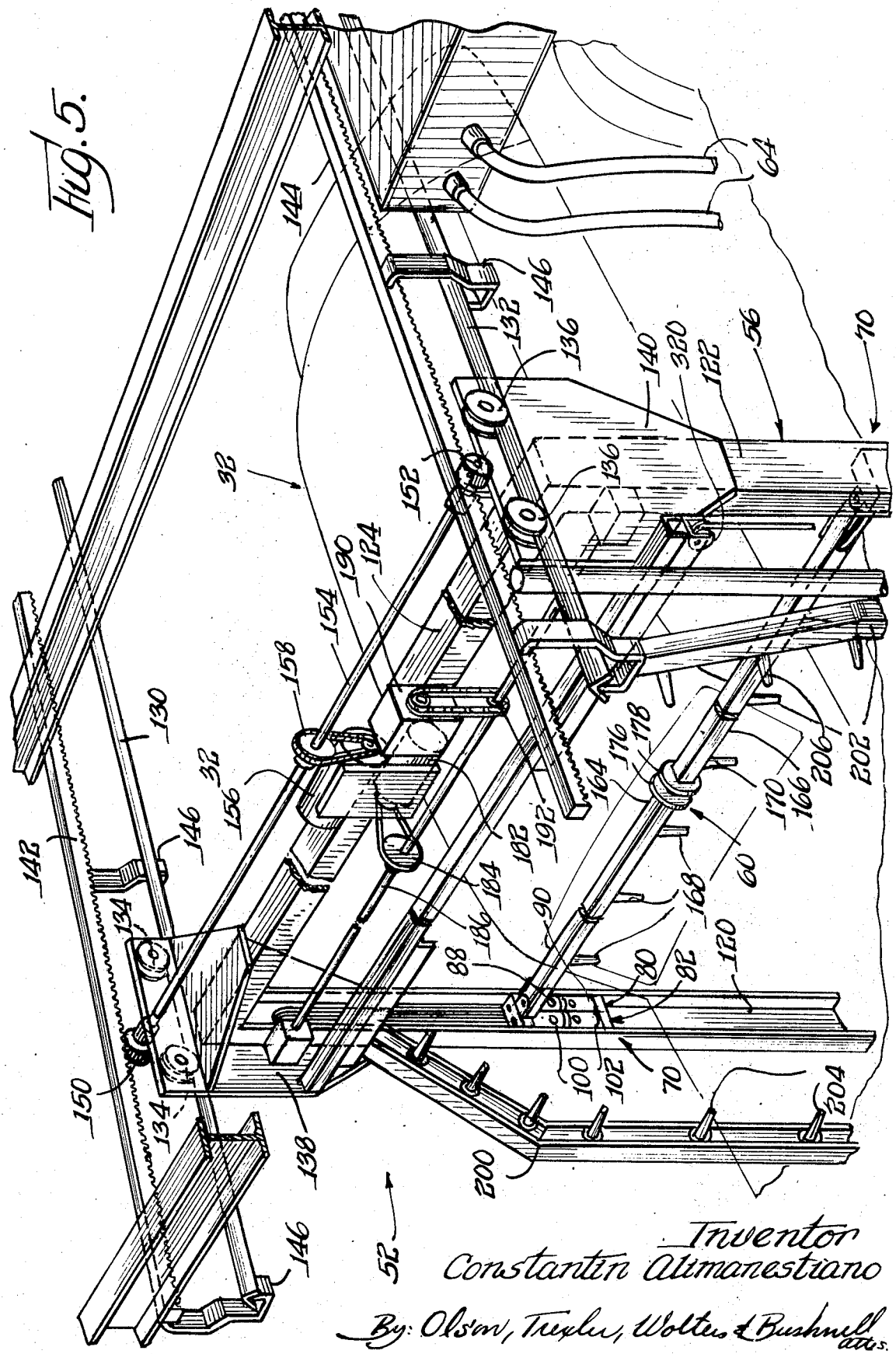

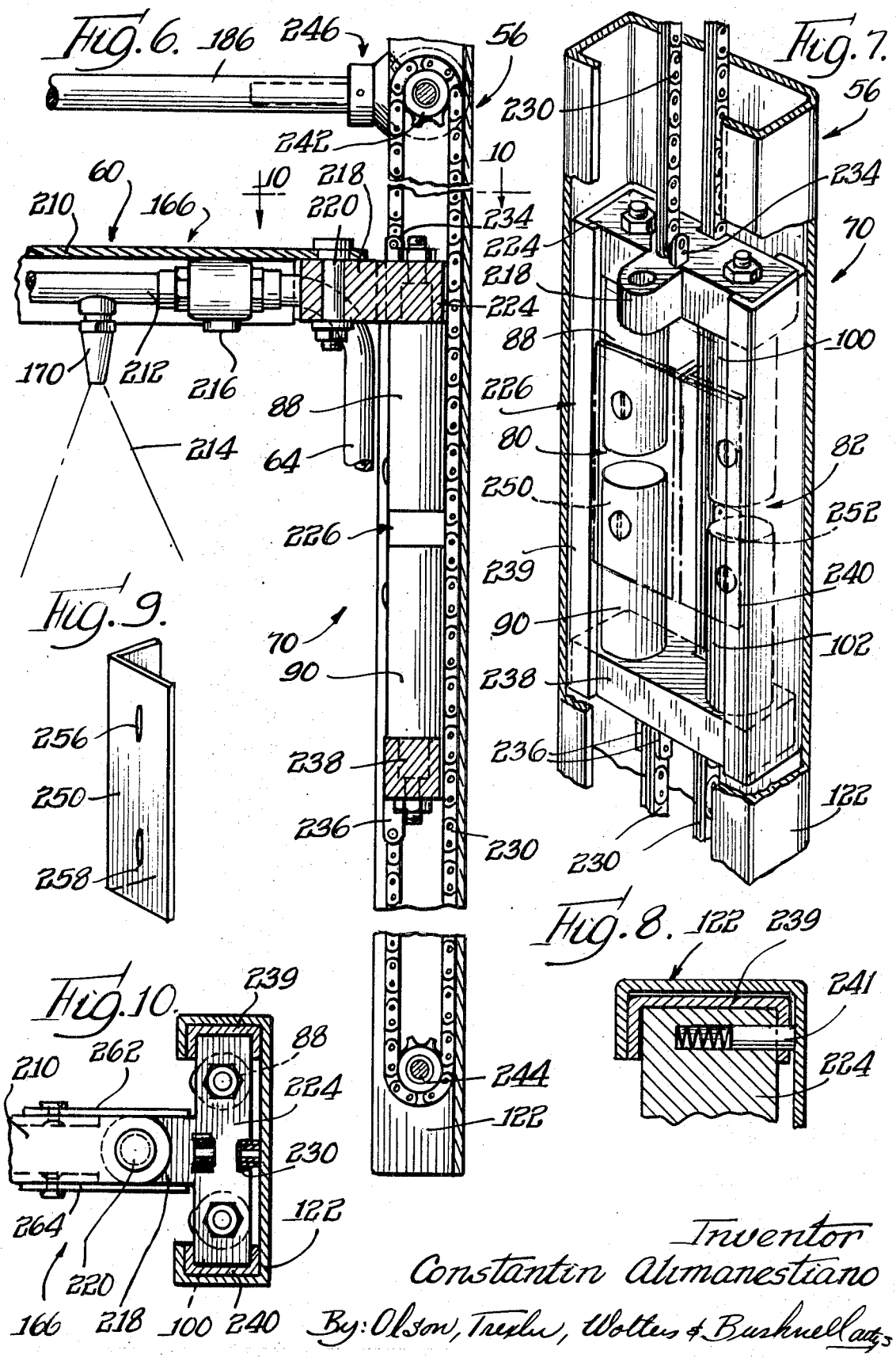

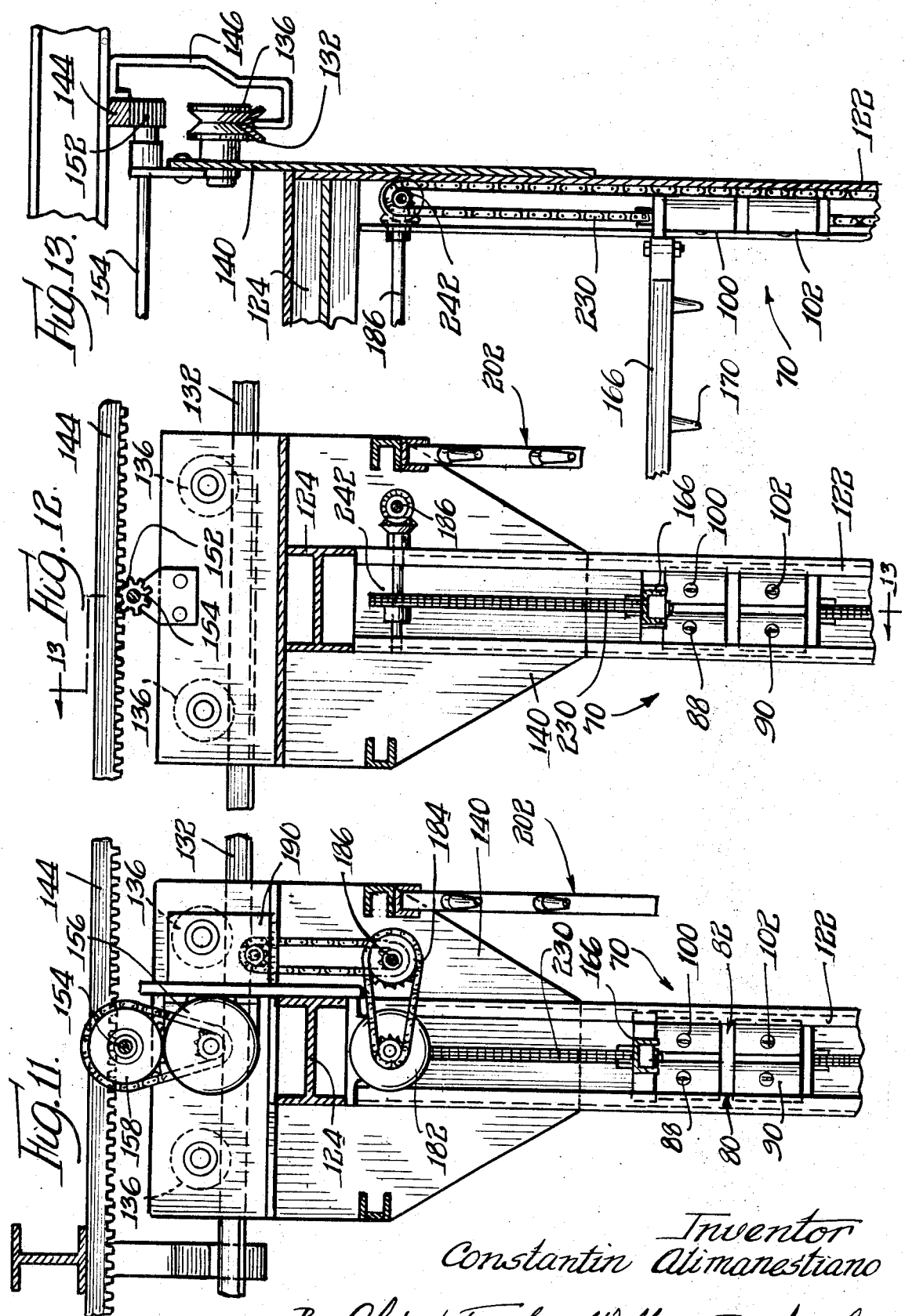

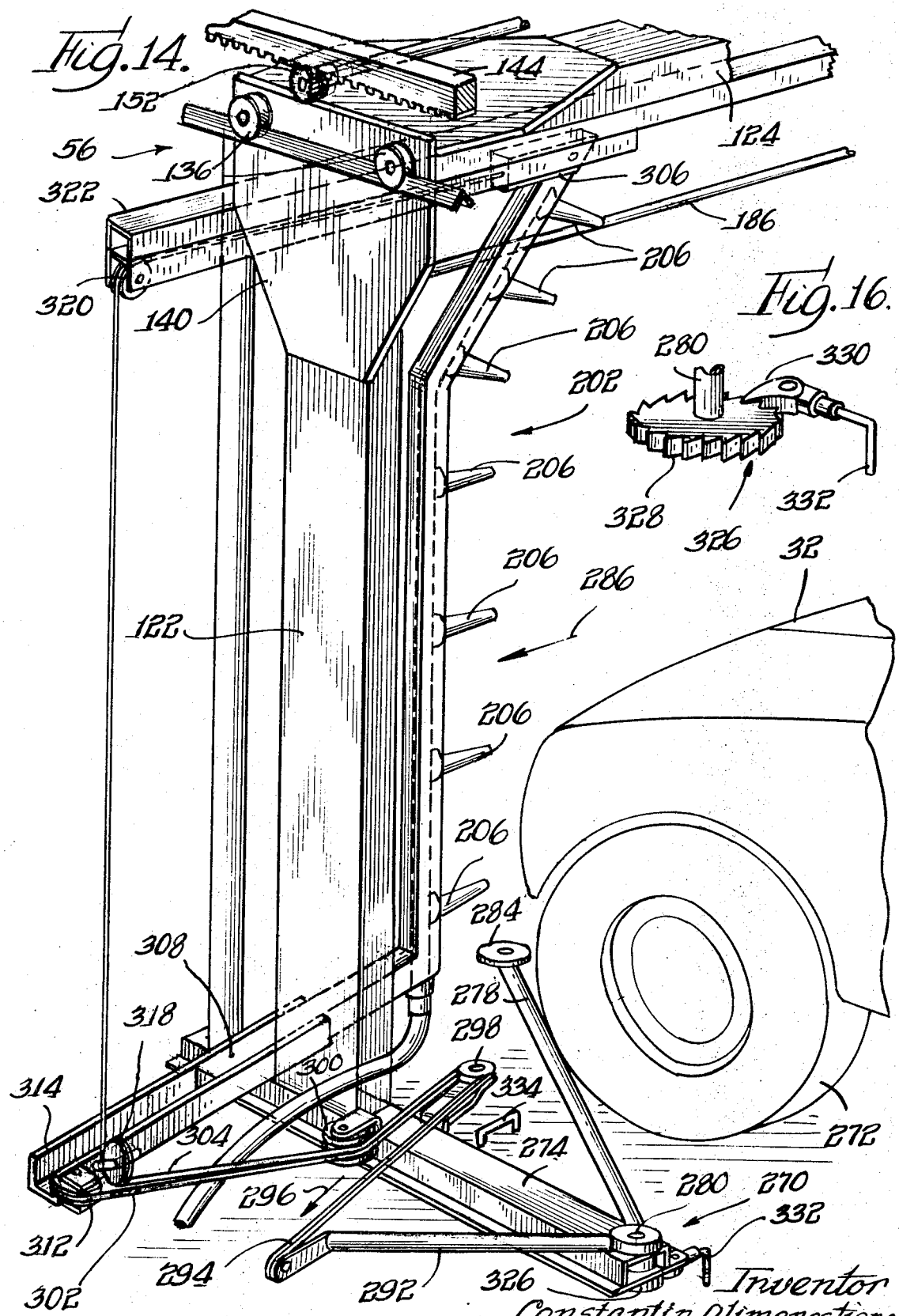

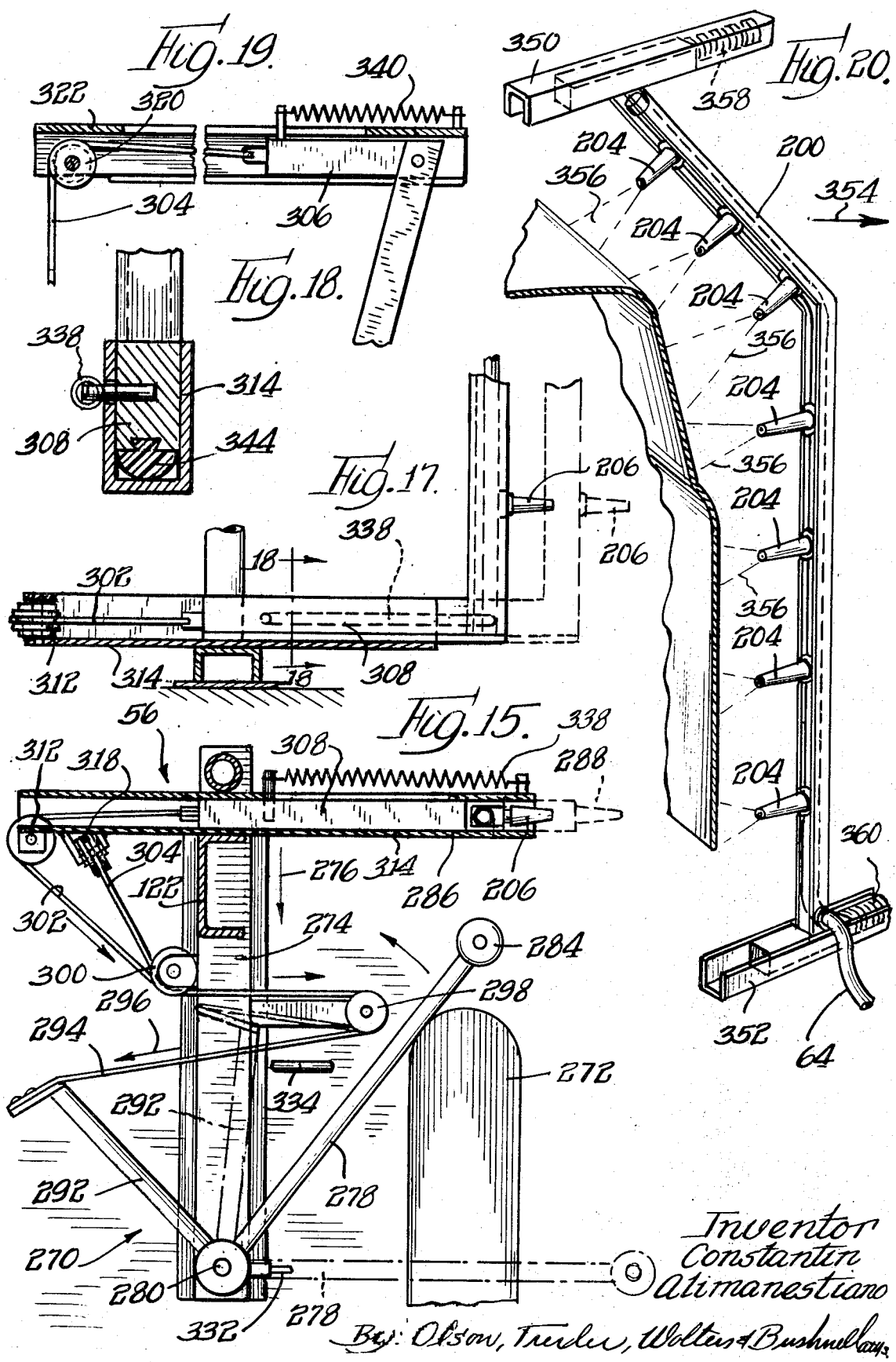

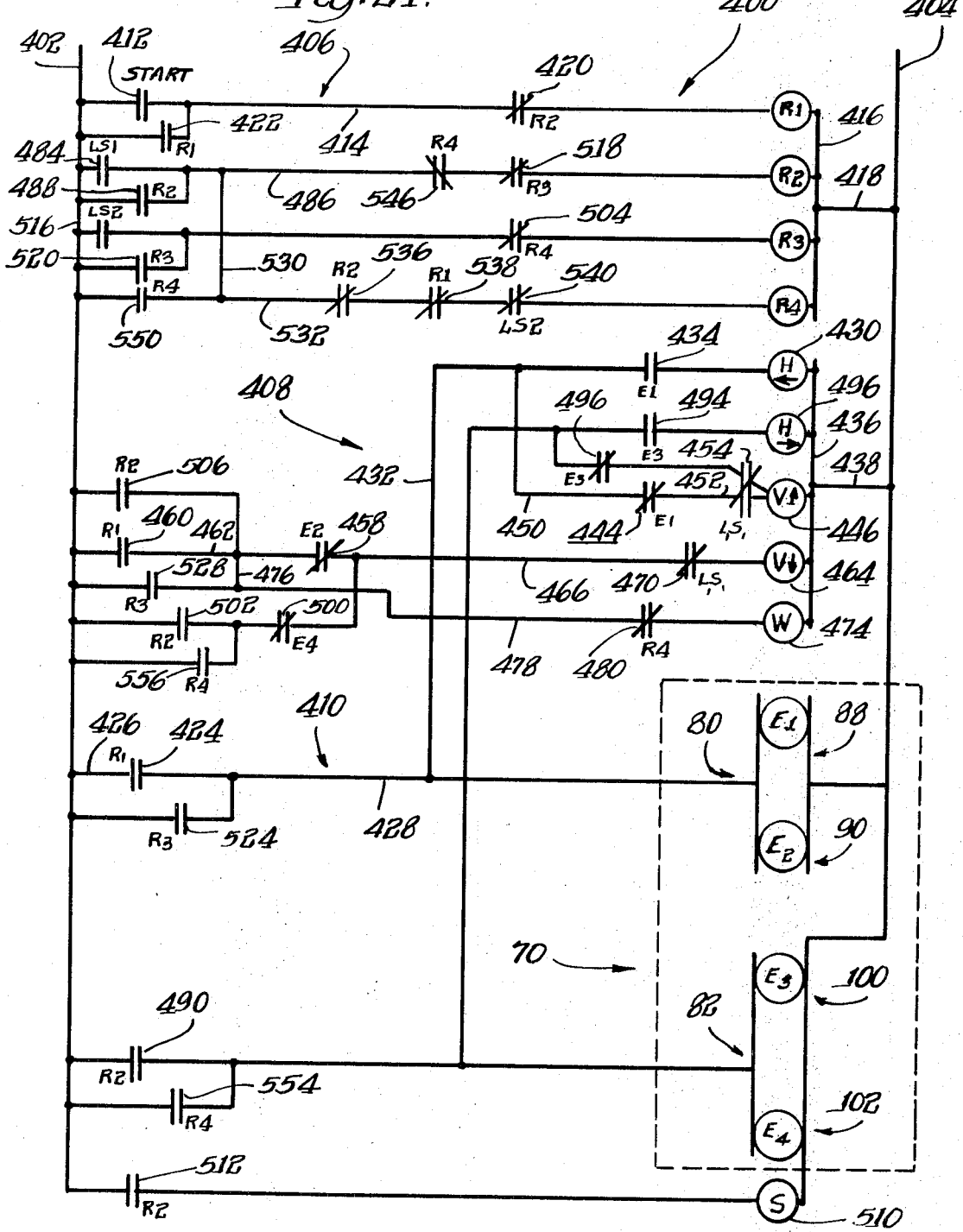

AUTOMATIC VEHICLE WASHING MECHANISM

DISCLOSURE

In prior art mechanized vehicle washing assemblies or "automatic car washes", a vehicle is attached to a relatively long continuous chain which is driven to pull the vehicle through a long building. As the vehicle is pulled through the building it passes a series of stations where various steps in the washing operation are performed. Although these prior art vehicle washing facilities are commonly referred to as being "automatic", a minimum of approximately four men are required for operating prior art mechanized vehicle washing facilities. One man is required to close the windows of a vehicle and attach the vehicle to the pullchain. Two more men are required for applying a detergent or cleansing solution to the vehicle. The fourth man disconnects the vehicle from the pullchain and returns the cleaned vehicle to its owner. Thus, the so-called "automatic car washes" of the prior art require several men to operate and are not truly automatic.

The operating personnel required for prior art mechanized vehicle washing facilities are obtained at considerable expense and difficulty. To obtain dependable men to wash vehicles, the owner of the prior art "automatic car wash" must pay relatively high wages to compete with employers seeking personnel for occupations having more social prestige. Once the owner of the prior art "automatic car wash" obtains the required personnel, he must cope with problems arising from employees' absenteeism and lack of punctuality. In addition to these problems, the owner must maintain extensive employee records which are required by both the state and federal government. The relatively high employee wages and the supervision of employees greatly increases the cost of operating the prior art "automatic car washes". Of course, the cost of the capital invested in equipment must be added to the aforementioned personnel costs. Thus, prior art "automatic car washes" are relatively expensive to operate.

In addition to having high operating costs, prior art vehicle washing mechanisms must be installed in relatively large long buildings. The building requirements are dictated by the need for a plurality of spaced-apart work or operating stations past which a vehicle is pulled. Since the vehicles are usually pulled in a straight line, by continuous chains, the building must be relatively long. Also, considerable additional space is required to provide room for the owners of vehicles being washed, the equipment required at the various operating stations, and facilities for the operating personnel.

While being expensive to operate, prior art mechanized vehicle washing assemblies usually do a relatively poor job of washing a vehicle. The poor wash job results in part from the use of the same washing brushes and cloths, and other implements, on each vehicle which is washed. After a series of vehicles have been washed, sand and grit adheres to the brushes, cloths, and other implements. Thereafter, the dirty washing implements merely spread the dirt around on a vehicle and are incapable of getting the vehicle clean. This lack of cleaning action on the part of the dirty washing implements is aggravated by the fact that the dirty implements rub sand and dirt against exterior surfaces of the vehicles. Naturally, the sand and other dirt particles tend to scratch and mar the smooth painted exterior surfaces of a vehicle as the dirty washing implements are rubbed against the vehicle.

Therefore, a general object of the present invention is to provide a truly automatic vehicle washing method and mechanism which overcomes the aforementioned limitations and problems of prior art constructions. Specifically, it is an object of this invention to provide a compact automatic vehicle washing mechanism which is inexpensive to operate and which uses a flow of water and/or detergent to wash a vehicle.

Another object of this invention is to provide a method for washing a vehicle wherein only a spray of fluid engages the vehicle while the vehicle is being washed.

Another object of this invention is to provide an automatic vehicle washing mechanism which can be operated in a space only slightly longer than the longest vehicle to be washed.

Another object of this invention is to provide an automatic vehicle washing mechanism capable of washing vehicles having many different heights, widths, and lengths.

Another object of this invention is to provide an automatic vehicle washing mechanism which can be operated in a portable housing or container.

Another object of this invention is to provide a sensor assembly which is spaced apart from an irregular object for maintaining a moving spray of water or other substance in a predetermined spacial relationship with the irregular object.

Another object of this invention is to provide a vehicle washing mechanism wherein a source of fluid under pressure is maintained in a predetermined spacial relationship with a vehicle due to a reaction between the vehicle and a flow of fluid under pressure from the source of fluid.

Another object of this invention is to provide a sensor system for detecting the general elevational contour of a vehicle or other irregular object with radiant energy and controlling movements of a source of liquid relative to the vehicle or other irregular object as a function of the sensed contour of the vehicle or other irregular object.

These and other objects and features of the invention will become more apparent upon a consideration of the following detailed description taken in connection with the accompanying drawings wherein:

FIG. 4 is an enlarged perspective view illustrating the relationship of a vehicle to a preferred embodiment of a vehicle washing mechanism;

FIG. 5 is an enlarged perspective view further illustrating the vehicle washing mechanism of FIG. 4;

FIG. 6 is an enlarged sectional view illustrating the relationship of a portion of a sensor unit for detecting an elevational contour of a vehicle to a wash arm for applying a cleansing and rinsing solution to the vehicle being washed;

FIG. 7 is an enlarged fragmentary perspective view of the sensor assembly of FIG. 6;

FIG. 8 is an enlarged sectional view illustrating the mounting of the sensor assembly of FIG. 7;

FIG. 9 is an enlarged perspective view of a shield which is used with the sensor assembly of FIG. 7 to enable the sensor assembly to detect objects or portions of objects having a relatively small cross-sectional area, such as the aerial or antenna of a vehicle;

FIG. 10 is an enlarged cross-sectional view illustrating the mounting of the wash arm of FIG. 6;

FIG. 11 is an enlarged cross-sectional view, taken along the line 11–11 of FIG. 4, illustrating a drive means for the frame assembly of FIG. 4;

FIG. 12 is an enlarged cross-sectional view, taken along the line 12–12 of FIG. 4, illustrating the mounting of the frame assembly relative to a guide rail and drive track;

FIG. 13 is an enlarged cross-sectional view, taken along the line 13–13 of FIG. 12, further illustrating the relationship of the frame assembly to the guide rail and drive track;

FIG. 14 is an enlarged perspective view of a generally upright wash arm and positioning assembly for flowing cleansing and washing solutions onto a first side of a vehicle;

FIG. 15 is an enlarged cross-sectional view illustrating the action of the positioning assembly on the upright wash arm of FIG. 14;

FIG. 16 is an enlarged perspective view of a latching mechanism used with the positioning assembly of FIGS. 14 and 15;

FIG. 17 is an enlarged cross-sectional view of a lower mounting for the wash arm of FIG. 14;

FIG. 18 is an enlarged cross-sectional view, along the line 18—18 of FIG. 17, further illustrating the wash arm mounting of FIG. 17;

FIG. 19 is an enlarged cross-sectional view illustrating an upper mounting for the wash arm of FIG. 14;

FIG. 20 is an enlarged perspective view of a wash arm for applying cleansing and rinsing solutions to a second side of a vehicle; and FIG. 21 is a schematic illustration of a control circuitry for the automatic vehicle washing mechanism.

Figure 1:
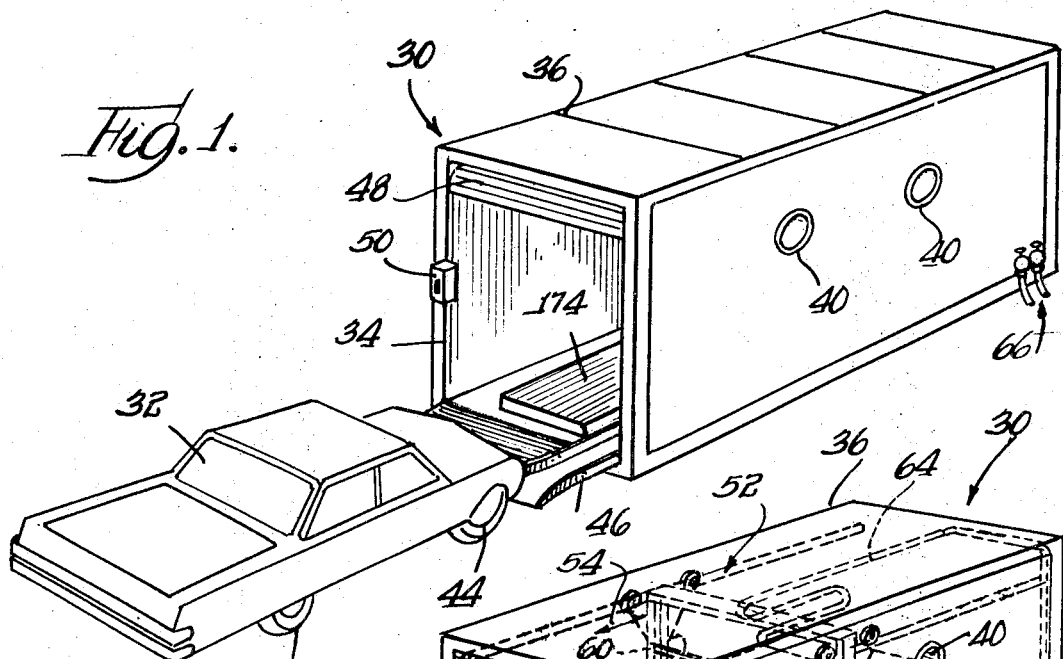
FIG. 1 is a perspective view illustrating a portable vehicle washing unit and a vehicle approaching an entrance to the unit.

Referring now to the drawings in greater detail, a portable vehicle washing unit 30 is illustrated in FIG. 1. A vehicle 32 is positioned adjacent to an entrance 34 of a housing structure or container 36 of the portable vehicle washing unit. The housing 36 includes a pair of windows or portals 40 through which a vehicle being washed in the housing can be viewed.

The vehicle 32 is driven into the housing by positioning wheels 42 and 44, which are adjacent to a right side of the vehicle, in a guide trough or track 46 and driving the vehicle into the housing 36. Once the vehicle 32 has been positioned in the housing 36 an articulated door structure 48 is moved from an open position of FIG. 1 to a closed position of FIG. 2. Coins of a suitable denomination are then inserted into a coin actuated control mechanism 50 to energize control circuitry to begin the automatic washing of the vehicle 32. The vehicle 32 is automatically washed by a vehicle washing mechanism 52 which is movable longitudinally of the housing 36 as indicated by the arrow 54 in FIG. 2.

The vehicle washing mechanism 52 includes a generally U-shaped frame or support structure 56 on which a wash bar or boom 60 is mounted. The wash bar or boom 60 includes a plurality of sources of fluid under pressure or nozzles which are movable vertically or upwardly and downwardly relative to both the vehicle and the frame 56. The wash bar 60 is moved longitudinally, in the direction of the arrow 54, relative to the vehicle 32 by the frame 56. A pair of generally upright wash-booms or bars, similar to the bar 60, are mounted on opposite sides of the generally U-shaped frame 56 to wash the sides of the vehicle 32. The wash bars are connected by a suitable flexible conduit 64 to fixtures 66 which are connected to a main source of water or other liquid under pressure. As the frame 56 is moved longitudinally relative to the vehicle 32, cleansing and rinsing solutions are dispensed from the wash bars to clean the vehicle 32.

As the frame 56 is moved longitudinally relative to the vehicle 32, the wash bar 60 is raised and lowered to keep the wash bar adjacent to the surface of the vehicle while maintaining the wash bar in a spaced apart relationship relative to the vehicle. The wash bar 60 is maintained in a position closely adjacent to the surface of the vehicle 32 during the longitudinal movement of the frame 56 so that fluid from nozzles on the wash bar impinge against the surface of the vehicle 32 with sufficient force to loosen dirt on the vehicle and clean the vehicle. Of course, the wash bar is raised and lowered as the frame 56 is moved longitudinally relative to the vehicle so that the wash bar does not crash against or engage the surface of the vehicle.

A sensor assembly 70 (see FIG. 3) is mounted on the frame 56 for sensing or detecting the elevational profile or contour of a vehicle which is being washed and controlling the vertical movement of the wash bar 60 relative to the vehicle as a function of the detected elevational profile or contour of the vehicle. The sensor assembly 70 senses the general profile of the vehicle 32 and controls a suitable drive means to move the wash bar 60 vertically relative to the vehicle so that the wash bar does not engage the vehicle as the frame 56 is moved longitudinally relative to the vehicle. This coordinated sensing of the elevational contour of a vehicle and contemporaneously therewith moving a wash bar longitudinally relative to the vehicle as a function of the sensed or detected contour of the vehicle enables the vehicle to be washed automatically by engaging the vehicle with only streams of high pressure fluid which is sprayed from sources on the wash bar onto the surface of the vehicle.

The sensor assembly 70 includes a plurality of sensor combinations 80 and 82 for sensing the general elevational contour of the vehicle 32. Each of the sensor combinations 80 and 82 include an upper sensor unit and a lower sensor unit. The upper sensor for the combination 80 is indicated schematically at 88 in FIG. 3, and a lower sensor unit for the combination 80 is indicated schematically at 90 in FIG. 3. The sensor units 88 and 90 each include an emitter mounted on the frame 56 on a first side of the vehicle and a receiver mounted on the frame 56 on a second opposite side of the vehicle at the same level as the emitter. The emitter transmits radiant energy to the receiver with which it is associated and mounted directly opposite. The sensor combination 80 operates to control the movements of the wash bar 60 when the frame 56 is moved rearwardly, that is to the left as viewed in FIG. 3. Similarly, the sensor combination 82 controls the movements of the wash bar 60 during forward movement of the frame 56, that is, movement of the frame toward the right as viewed in FIG. 3.

The lower sensor unit 90 of the sensor combination 80 is connected to a suitable drive means to lower the wash bar 60 when the receiver is activated by the transmission of radiant energy from the associated emitter. Thus, the transmission of radiant energy between the emitter and receiver of the sensor unit 90 is normally blocked by a vehicle which is being washed. The sensor unit 88 on the other hand is activated to move the spray arm 60 upwardly relative to the vehicle 32, and to contemporaneously therewith stop the longitudinal movement of the frame 56 relative to the vehicle, when the transmission of radiant energy between the associated emitter and receiver is blocked. Thus, when the spray arm 60 is in a normal wash position, radiant energy is transmitted between the emitter and receiver of the sensor unit 88 while the transmission of radiant energy between the emitter and receiver of the sensor unit 90 is block.

Figure 3:
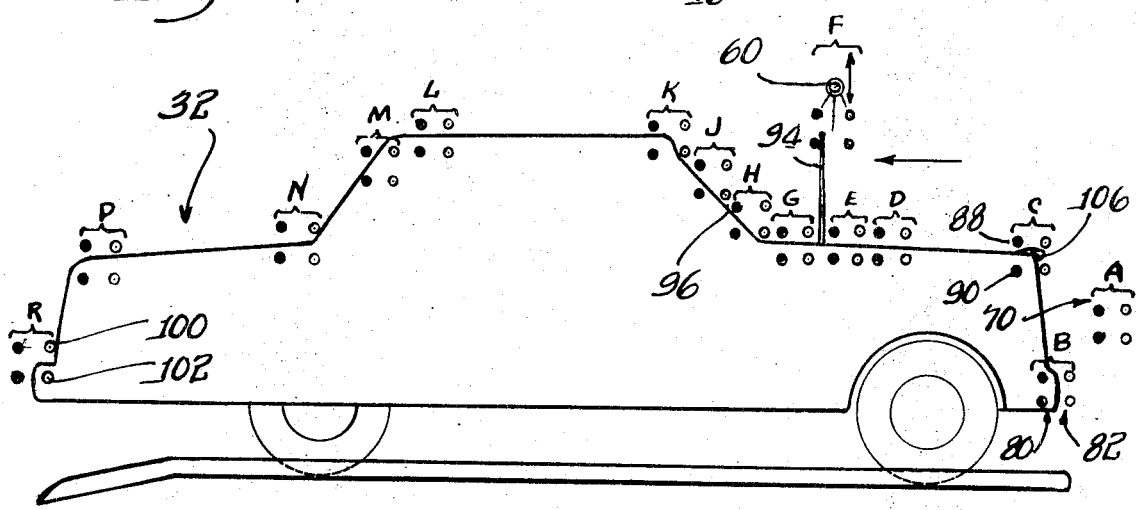
FIG. 3 is a schematic illustration showing the relationship of a sensor assembly relative to a vehicle being washed in the automatic vehicle washing unit of FIG. 2.

When the vehicle washing mechanism 52 is energized, the sensor assembly 70 and the spray bar 60 are moved both downwardly and rearwardly from a raised initial position through an intermediate position, indicated at A in FIG. 3, to the position indicated at B in FIG. 3. The wash bar 60 is moved downwardly, since the transmission of radiant energy between the emitter and receiver of the sensor unit 90 is not blocked by the vehicle 32 when the wash bar 60 is in the position indicated at A in FIG. 3. The wash bar 60 is also moved rearwardly relative to the vehicle 32 since the transmission of energy between the emitter and receiver associated with the upper sensor unit 88 is not blocked by the vehicle. When the sensor assembly 70 is located as indicated at B in FIG. 3, the transmission of radiant energy between the emitter and receiver of the upper sensor unit 88 is blocked and the forward movement of the sensor assembly 70 and the wash bar 60 is immediately halted to prevent the wash bar from engaging the vehicle 32. Contemporaneously with the halting of the movement of the wash bar rearwardly relative to the vehicle 32, the sensor unit 88 energizes a suitable drive means to move the wash bar upwardly so that the transmission of radiant energy between the emitter and receiver of the sensor unit 88 is no longer blocked, as indicated at C in FIG. 3.

When sensor assembly 70 is in the position indicated at C in FIG. 3, the frame 56 is moved rearwardly relative to the vehicle 32 while maintaining the wash bar 60 in a substantially constant spacial relationship with the vehicle 32. During this movement, the transmission of radiant energy between the emitter and receiver of the sensor unit 90 is blocked so that the wash bar 60 is not moved downwardly relative to the vehicle. However, during this movement the sensor assembly 70 is positioned so that radiant energy can be freely transmitted between the emitter and receiver of the sensor unit 88. Therefore, the frame 56 is moved rearwardly from position C to position D with no vertical motion of the wash bar 60. This substantially horizontal rearward movement of the wash bar 60 continues through position D to position E. Immediately after position E, the transmission of radiant energy between the emitter and receiver of the upper sensor unit 88 is blocked by an aerial or antenna 94 of the vehicle 32. Since the transmission of radiant energy by the sensor unit 88 is blocked by the aerial 94, the rearward movement of the frame 56 is halted and the wash bar 60 is moved upwardly to clear the aerial 94 so that the sensor assembly 70 is in the position indicated at F in FIG. 3.

When the transmission of radiant energy between the emitter and receiver of the upper sensor unit 88 is no longer blocked by the aerial 94, the wash bar 60 is above the aerial 94. As the frame 56 is moved rearwardly, the transmission of radiant energy by the lower sensor unit 90 is no longer blocked by the aerial 94. When this occurs, the wash bar 60 is lowered relative to the vehicle 32. This lowering action of the wash bar 60 relative to the vehicle does not occur with sufficient rapidity to lower the wash bar 60 forwardly of the aerial 94. Rather, the wash bar 60 is lowered while the frame 56 is moved rearwardly so that the wash bar 60 clears the aerial 94. The downward and rearward movement of the wash bar 60 continues until position G is reached, whereat the transmission of radiant energy by the lower sensor unit 90 is blocked by the vehicle 32. Immediately upon the blocking of the transmission of radiant energy between the emitter and receiver of the lower sensor unit 90, the downward movement of the wash bar 60 is halted. The wash bar is then moved substantially horizontally rearwardly until the transmission of radiant energy by the upper sensor unit 88 is blocked by the upwardly and rearwardly sloping windshield area 96 of the vehicle 32. The wash bar 60 is then moved upwardly and rearwardly in a step-like fashion from position H to position J and finally to position K.

At position K, the upper sensor unit 88 is clear of the roof line of the vehicle 32 and the wash bar 60 is moved horizontally rearwardly along the roof of the vehicle to position L. Immediately rearwardly of position L, the transmission of radiant energy by the sensor unit 90 is no longer blocked and the wash bar is moved downwardly and rearwardly in a step-like manner through position M to position N, whereat a truck portion of the vehicle 32 blocks the transmission of energy by the sensor unit 90 so that the wash bar 60 is moved rearwardly without change in elevation to position P. Immediately rearwardly of position P, the lower sensor unit 90 is clear of the end of the trunk portion of the vehicle 32 and the wash bar 60 is moved downwardly and rearwardly relative to the trunk to a position indicated at R in FIG. 3. Again, it should be noted that the spacing between the control assembly 70 and the wash bar 60 and the rate of rearward movement which occurs contemporaneously with the downward movement of the wash bar 60 is sufficient to enable the wash bar to clear the end of the trunk while moving from position P to position R in much the same manner as the wash bar clears the upper end of the aerial or antenna 94.

During a second cycle or step of operation, the wash bar 60 and frame 56 are moved forwardly relative to the vehicle 32 from the position indicated at R to the position indicated at A in FIG. 3. During this reverse or forward movement of the wash bar 60 relative to the vehicle, the sensor combination 82 functions in much the same manner as the sensor combination 80 functions to position the wash bar 60 during the rearward movement of the wash bar relative to the vehicle. Thus, the sensor combination 82 includes an upper sensor unit 100 which functions in much the same manner as the sensor unit 88 to halt the forward movement of the frame 56 and to raise the wash arm 60 when the transmission of radiant energy between an emitter and receiver of the sensor unit 100 is block. The sensor unit 102 functions in a manner similar to the sensor unit 90 to lower the wash bar 60 relative to the vehicle 32 contemporaneously with a forward motion of the wash bar when energy can be freely transmitted between the emitter and receiver of the sensor unit 102.

The sensor assembly 70 controls the movements of both the generally U-shaped frame 56 and the wash bar 60 by sensing or detecting the elevational contour or outline of a vehicle which is to be washed. The wash bar 60 is moved along a path having a configuration which is substantially geometrically similar to the sensed elevational contour of a vehicle which is to be washed. The path of movement of the wash bar 60, while being generally geometrically similar to the general contour or outline of a vehicle, is larger than the general elevational contour of the vehicle since the wash bar is located at all times in a position spaced vertically outwardly from the vehicle. The path of the wash bar 60 is only substantially similar to the general elevational outline or contour of the vehicle 32 since the sensor assembly 70 is effective to control the movement of the wash bar 60 only within predetermined limits or a range, since the upper sensor unit 88 is spaced apart from the lower sensor unit 90 and the position of the wash bar 60 relative to the vehicle 32 is not effected by changes in the contour of a vehicle which come within the limits or distance between the upper sensor unit 88 and the lower sensor unit 90. For example, a relatively low hood ornament, such as is indicated at 106 in FIG. 3, would not be detected by the sensor assembly 70 since the hood ornament has a vertical dimension which is less than the distance between the sensor unit 88 and the sensor unit 90. Thus, the hood ornament falls within the range of permissible variation between the path of movement of the wash arm 60 and the elevational contour of the vehicle 32.

In view of the foregoing remarks it is apparent that the disclosed invention includes a generally portable vehicle washing unit 30 having a housing 36 in which vehicles are washed by a vehicle washing mechanism 52. The vehicle washing mechanism 52 washes vehicles 32 by engaging the vehicle only with a stream or spray of cleansing fluid and rinsing fluid. The spray of cleansing and rinsing fluid is maintained in a predetermined spacial relationship relative to a vehicle which is to be washed by means of a sensor assembly 70 which is spaced apart from the vehicle and automatically positions the wash arm 60 relative to the vehicle. The sensor assembly 70 detects the elevational contour of the vehicle by the transmission of radiant energy and does not directly engage the vehicle. The sensor assembly 70 moves the wash arm 60 as a function of the detected elevational contour of the vehicle The sensor assembly 70 moves the wash arm 60 as a function of the detected elevational contour of the vehicle along a path which is substantially similar to the general elevational contour of the vehicle. Therefore, the vehicle washing mechanism 52 is truly automatic since it relates to a self acting mechanism that performs a required act, for example positioning of the wash arm 60, at a predetermined point in an operation. Or more simply stated, the vehicle washing mechanism 52 is truly automatic since it is limited to machine operation and denies or does not require manual operation to wash a vehicle.

The vehicle washing mechanism 52 is illustrated in greater detail in FIGS. 4 and 5 wherein it can be seen that the generally U-shaped frame 56 includes a pair of spaced apart parallel downwardly extending legs or side sections 120 and 122 which are interconnected by a horizontally extending cross or connector base bar or section 124, to provide a rigid frame which extends around upper and outer side surfaces of the vehicle 32. The frame 56 is supported by a pair of longitudinally extending parallel V-shaped angle bars or rails 130 and 132 which are engaged by wheels or rollers 134 and 136 mounted on support brackets 138 and 140 on the leg sections 120 and 122 of the frame 56. The rollers 134 and 136 support and guide the frame for longitudinal movement rearwardly and forwardly of the vehicle 32. A pair of parallel spaced apart drive tracks 142 and 144 are mounted immediately above and parallel to the guide rails 130 and 132 on brackets 146. The drive tracks 142 and 144 have downwardly extending teeth so that they have a shape similar to that of a rack type gear. The drive tracks 142 and 144 are engaged by drive pinions 150 and 152 which are fixedly connected to a drive shaft 154 supported by the brackets 138 and 140. A frame drive motor 156 is connected to the drive shaft 154 by a suitable transmission assembly, such as a sprocket and chain drive 158. The frame drive motor 156 is equipped with a commercially available reversing starter so that the direction of rotation of the motor 156 can be reversed to rotate the drive shaft 154 in either a counterclockwise direction to move the frame 56 rearwardly relative to the vehicle 32 or in a clockwise direction to move the frame 56 forwardly relative to the vehicle 32.

The wash arm or boom 60 is mounted on the leg sections 120 and 122 of the generally U-shape frame 56. The wash boom 60 includes a pair of arms or bars 164 and 166 which extend outwardly toward each other at the same vertical level from the legs 120 and 122. A plurality of downwardly extending spaced 67 apart nozzles 168 and 170, which act as sources of fluid under pressure, are mounted on the bars 164 and 166. The nozzles 168 and 170 are connected by flexible conduits 64 (see FIGS. 2 and 5) to a primary or main source of water under pressure and a primary or main source of detergent, such as a floor tank 174 (see FIG. 4). The nozzles 168 and 170 apply a stream or spray of liquid, either a cleansing solution or a rinsing solution, to upper surfaces of the vehicle 32. The arms 164 and 166 are equipped with a pair of adjacent rollers 176 and 178 which are mounted on the inner ends of the arms for engagement with the upper surface of an automobile in the event the sensing assembly 70 should malfunction.

The wash boom or arm 60 is moved vertically relative to the vehicle 32 by a wash arm drive motor 182 which is connected by a chain and sprocket drive 184 to a drive shaft 186. The drive shaft 186 is connected at its outer ends to a pair of chain drives which are housed in the leg sections 120 and 122 and connected to the arms 164 and 166 to move the arms relative to the vehicle 32. The wash arm drive motor 182 is equipped with a reversing starter so that the direction of rotation of the drive shaft 186 can be reversed to move the arms 164 and 166 either upwardly or downwardly relative to the vehicle 32. A magnetic brake 190 is connected to the drive shaft 186 by a suitable connection, such as a chain and sprocket assembly 192. The magnetic brake 190 is energized when the wash arm drive motor 182 is deenergized to immediately stop the vertical movement of the wash arms 164 and 166 relative to the vehicle 32 and to hold the wash arms in the position at which they are stopped.

As is perhaps best seen in FIG. 5, the sensor assembly 70 is connected to the wash boom 60 for vertical movement contemporaneously with the arms 164 and 166. In the preferred embodiment of the invention the sensor units 88, 90, 100 and 102 include emitters which emit light rays to receivers or photoelectric cells. In the embodiment of the invention illustrated in FIG. 5, the emitter or light source is mounted in the leg section 120 while the receiver or photoelectric cell is mounted in the leg section 122. Thus, the sensor assembly 70 includes a plurality of light sources mounted on one side of the vehicle 32 from which light rays are emanated toward photoelectric cells mounted on an opposite side of the vehicle 32. As was previously explained, when the wash boom or arm 60 is in a normal operating position relative to the vehicle 32, light is transmitted from the light sources associated with the upper sensor units 88 and 100 to the associated photoelectric cells in the opposite leg section. Also, when the wash boom 60 is in its normal position, the transmission of light rays from the lower light sources to the associated photoelectric cells of the sensor units 90 and 102 is blocked by the vehicle 32.

A pair of spaced apart generally upright side wash arms or booms 200 and 202 are mounted adjacent to the leg sections 120 and 122 on opposite sides of the vehicle 32. The side wash arms 200 and 202 include a plurality of nozzles or sources of fluid 204 and 206 which are also connected to a source of cleansing solution and rinsing solution under pressure. The rinsing and cleansing solutions are applied in a stream or spray against the sides of the vehicle 32 by the wash arms 200 and 202. The wash arms 200 and 202 are supported by the frame 56 for longitudinal movement both rearwardly or forwardly relative to the vehicle 32 contemporaneously with the forward and rearward movement of the wash arms 164 and 166. Thus, the upper and side surfaces of the vehicle 32 are washed and rinsed by the wash arms 164, 166, 200 and 202 as the frame 56 is moved forwardly and rearwardly relative to the vehicle by the frame drive motor 156. The wash arms 164 and 166 are moved vertically relative to the vehicle 32 and the frame 56 contemporaneously with the longitudinal movement of the frame by the wash arm drive motor 182.

Referring now to FIGS. 6 and 7, it can be seen that the wash bar 166 includes an outer channel or housing 210 in which a central fluid conducting conduit 212 is mounted. The nozzles 170 are connected to the conduit 212 and emit a flow of fluid in the form of a spray or stream 214. A shutoff valve 216 is advantageously mounted between the conduit 212 and the flexible conduit or hose 64 which is connected to a source of fluid under pressure. The channel or housing 210 is mounted on an outwardly extending protuberance or support section 218 by a pin 220. The support section 218 is integrally formed with a cross piece 224 of a frame assembly 226 on which the receivers or photoelectric cells for the sensor assembly 70 are mounted. The frame 226 is connected to a vertical drive chain 230. The vertical drive chain 230 is attached to the frame 226 at a pair of ears 234 which extend from the upper cross piece 224 and a pair of ears 236 which extend from a lower cross piece 238. The cross pieces 224 and 238 are fixedly interconnected by a pair of opposite generally parrallel channels 239 and 240. The channels 239 and 240 are connected to the cross pieces by a plurality of locking pins 241, as is illustrated in FIG. 8. The chain 230 extends around a drive sprocket 242 mounted at an upper end portion of the leg section 122 and a lower idler sprocket 244 which is mounted adjacent to an opposite lower end of the leg section 122.

The drive sprocket 242 is rotated by the drive shaft 186 through a bevel gear assembly 246 to move the sensor assembly 70 and the wash arm 166 vertically relative to the leg section 122 and the vehicle 32. The wash arm 164 and the emitter portion of the sensor assembly 70 are also mounted on a frame for movement relative to the leg section 120 and vehicle 32 contemporaneously with the movement of the receiver section of the sensor assembly 70 and wash arms 166. Since the mounting frame and drive assembly for the wash arm 164 and the emitter portion of the sensor assembly 70 are substantially similar to the structure illustrated in FIGS. 6 and 7, it is believed that a separate detailed explanation of the mounting and drive structure for the wash arm 164 and emitter portion of the sensor assembly is not required.

Referring now to FIG. 9, taken in connection with FIG. 7, a pair of substantially similar shields 250 and 252 are mounted relative to the receivers of the sensor assembly as shown in FIG. 7. The shields 250 and 252 include relatively narrow slits or apertures 256 and 258 which cover the relatively large photoelectric cell of the receivers or photocells of the sensor units 88, 90, 100 and 102. The emitters or light sources associated with the receivers are also equipped with shields similar to the shields 250 and 252 having apertures similar to the slits 256 and 258. The slits 256 and 258 extend vertically relative to the vehicle 32 and direct the radiant energy or light from the emitters along a relatively narrow carefully defined path toward the receivers. The shields on the receivers limit the radiant energy which is transmitted to the receivers to radiant energy on predetermined paths from the emitter. The use of the shields 250 and 252 enables the receivers to readily detect the aerial or antenna 94 of the vehicle 32. If the shields 250 and 252 were not used with the sensor assembly 70, the sensor assembly would be unable to detect the relatively small cross section of the antenna or aerial 94.

As is perhaps best seen in FIG. 10, a pair of leaf springs 262 and 264 are fixedly connected to the channel or housing 210 and extend outwardly in juxtaposition with opposite sides of the support section 218. The springs 262 and 264 enable the wash arm 166 to pivot relative to the frame 192 about the pin 220. The springs 262 and 264 engage the support section 218 to hold the wash arm 166 in a normal position extending substantially perpendicularly outwardly from the leg section 122. If the wash arm 166 should be pressed against or banged on the vehicle 32, due to an unforeseen failure of the sensor assembly 70, the springs 262 and 264 would enable the wash arm to pivot without damaging the vehicle 32.

The cooperation between the frame drive motor 156, the wash arm drive motor 182, the frame 56 and the sensor assembly 70 is illustrated in further detail in FIGS. 11 through 13. The frame drive motor 156 is supported by the cross piece or section 124 so that the pinion gear 152 at the end of the drive shaft 154 engages the drive track 144. When the drive motor 156 is energized the frame 56 is moved longitudinally relative to the drive track 144 and guide rail 132. Contemporaneously with the longitudinal movement of the frame 56 by the drive motor 156, the wash boom 60 is raised or lowered relative to the frame by the wash arm drive motor 182 which rotates the drive shaft 186. The rotation of the drive shaft 186 rotates the drive sprocket 242 to move the wash arm 166 and sensor assembly 70 relative to the frame and a vehicle which is being washed. The sensor assembly 70 controls the energization of the wash arm drive motor 182, in the manner previously explained in connection with FIG. 3, to raise and lower the wash arm 166 as a function of the detected elevational contour of a vehicle which is to be washed. Since the wash arm 166 moves on a path which is substantially similar to the elevational configuration of an automobile to be washed, the nozzles 170 are maintained within predetermined limits in a relatively constant spacial relationship with the vehicle 32 so that a spray or stream of fluid from the nozzles 170 is effective to cleanse and rinse a vehicle which is being washed. Of course, the wash arm 164 is raised and lowered contemporaneously with the wash arm 166 in much the same manner as is the wash arm 166.

Figure 2:
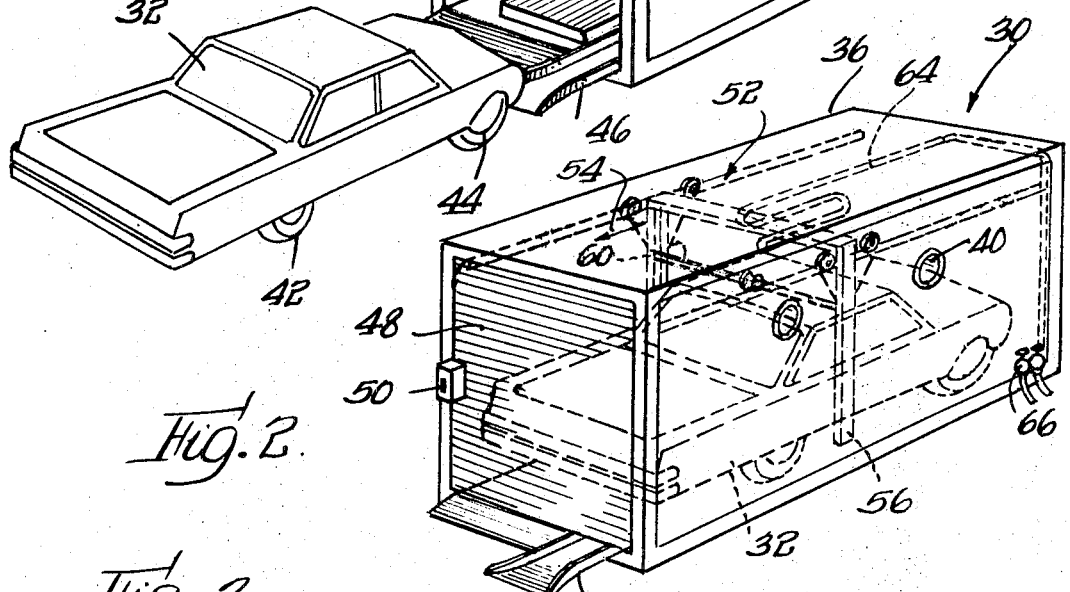
FIG. 2 is a schematic illustration of the relationship of a vehicle being washed to the vehicle washing unit.

As was explained in connection with FIGS. 1 and 2, the wheels 42 and 44 on the right side of the vehicle 32 are positioned relative to the vehicle washing mechanism 52 by a track 46. Since the automatic vehicle washing mechanism is intended for use with vehicles having various widths, the position of the left side wash arm 202 (see FIG. 4) is adjustable so that the nozzles 206 are spaced within a predetermined distance from the left side of the vehicle 32. The position of the side wash arm 202 is adjusted by a positioning assembly 270 which is best seen in FIG. 14. The positioning assembly 270 sensibly engages a left front wheel 272 of the vehicle 32. The side wash arm 202 is then located relative to the left side of the vehicle 32 by the positioning assembly 270 in accordance with the sensed position of the wheel 272. Thus, the positioning assembly 270 sensibly engages the left side of the vehicle, specifically the wheel 272, to adjust the position of the side wash arm 202 relative to the vehicle 32.

The positioning assembly 270 is connected to the leg section 122 of the frame 56 by a support beam or member 274 which is connected to a lower end portion of the leg section 122. As the frame 56 is moved rearwardly, in the direction indicated by an arrow 276 in FIG. 15, a positioning lever or feeler 278 engages the wheel 272 and is pivoted in a counterclockwise direction about a pin or axle 280 from the position shown in dashed lines in FIG. 15 toward the position shown in solid lines in FIG. 15. As the rearward movement of the frame 56 continues, the positioning lever 278 is slid along the surface of the wheel 272 until a wheel or disc 284 is in rolling engagement with the wheel 272 of the vehicle 32. The movement of the positioning lever 278 from the initial position to a normal washing or operating position moves the wash arm 202 in the direction of the arrow 286 (of FIG. 14) so that the nozzles 206 clear the side of the vehicle 32. The nozzles 206 are moved outwardly relative to the vehicle 32 from an initial position, indicated in dashed lines at 288 in FIG. 15, to a normal operating position as a function of the sensed position of the wheel 272 and, consequently, the left side of the vehicle 32. When the nozzles 206 are in a normal operating or washing position, the nozzles are positioned a relatively small distance transversely outwardly of the left side of the vehicle 32 so that a stream or spray of fluid from the nozzles 206 impinges on the left side of the vehicle 32 as the frame 56 is moved forwardly and rearwardly relative to the vehicle.

A cable drive arm 292 is fixedly connected to the positioning arm 278. The cable arm 292 is pivoted about a pin or axle 280 contemporaneously with the positioning arm 278 by the engagement of the positioning arm with the wheel 272 to move the cable arm 292 from an initial position shown in dashed lines in FIG. 15 to a normal operating position. As the cable arm 292 is pivoted in a counterclockwise direction relative to the pin 280 by the engagement of the positioning arm 278 with the wheel 272, a cable means 294 is moved in the direction of the arrow 296. As is best seen in FIG. 14, the cable means 294 extends around pulleys 298 and 300 and is made up of two separate cables 302 and 304 which are connected to upper and lower end portions or bars 306 and 308 of the side wash arm 202. The cable 302 extends around a pulley 312 into a generally U-shaped track or housing 314 to connect with the lower end portion 308 of the side wash arm 202. Similarly, the cable 304 extends around pulleys 318 and 320 into a second U-shaped channel or housing 322 to connect with the upper end portion 306 of the side wash arm 202. When the positioning arm 278 and cable arm 292 are pivoted about the pin 280, the cables 302 and 304 are pulled to draw the end portions 306 and 308 of the side wash arms 202 inwardly relative to the frame 56. The channels or housings 314 and 322 act as tracks to guide this movement of the end portions of the side wash arm 202. Since the movement of the side wash arm 202 is directly proportional to the pivoting movement of the positioning arm 278, the nozzles 206 on the side wash arm 202 are positioned relative to the side of a vehicle as a function of the width of a vehicle by the sensing engagement of the positioning arm with the wheel 272 of the vehicle. In this manner the vehicle washing mechanism 52 is adjusted so that vehicles of different widths can be washed.

When the frame 56 is moved rearwardly relative to the vehicle 32, the disc 284 is moved rearwardly past the wheel 272. A latch assembly 326 is mounted on the pin or axle 280 to retain the positioning arm 278 in the position which it is pivoted to by engaging the wheel 272. The latch assembly 326 includes a ratchet or locking wheel 328 which is best seen in FIG. 16. The ratchet wheel 328 has a plurality of teeth which engage a latch pawl 330 to prevent the ratchet wheel from moving in a clockwise direction as viewed from above in FIG. 16. The ratchet pawl and wheel hold the positioning arm 284 in the outward position during the traversing movement of the frame 56 while the vehicle is washed. As the frame 56 is returned to its initial position a release lever or arm 332 on the pawl 330 (see FIGS. 14 and 16) engages a release protuberance or actuator 334 (see FIG. 14) to pivot the pawl 330 out of engagement with the ratchet wheel 328. When the pawl 330 is disengaged from the ratchet wheel 328, the positioning arm 278 is free to pivot back to the initial position indicated in dashed lines in FIG. 15.

As is best seen in FIGS. 17 and 19, the side wash arm 202 is moved from the normal washing position to the initial position under the urging of a pair of springs 338 and 340 which are connected to the channels 314 and 322 and the side arm 202. Relatively free movement of the side wash arm 202 from the initial position to the normal operational or washing position and back to the initial position is promoted by an antifriction glide or slide 344 which is best seen in FIG. 18. The glide 344 slidably engages an inner surface of the channel or housing 314 which functions as a track to guide the movement of the wash arm 202. Thus, the wash arm 202 is easily slid relative to the tracks 314 and 322 from an initial position to an operational or washing position by the engagement of the positioning arm 278 with the wheel 272 of a vehicle which is to be washed.

The wash arm 200 for the right side of the vehicle 32 is illustrated in FIG. 20. As previously mentioned in connection with FIG. 4, the wash arm 200 is mounted on the frame 56 and includes a plurality of nozzles 204 which are connected by the flexible conduit 64 to a source of fluid under pressure. The right side wash arm 200 is mounted for sliding movement relative to the vehicle 32 in a pair of tracks 350 and 352. The wash arm 200 is slid outwardly in the direction of the arrow 354 from an initial position to a normal operating position by a reaction force which occurs when streams or sprays 356 of fluid from the nozzles 204 impinge against the side of the vehicle 32. This reactive force presses the wash arm 200 outwardly against the urging of springs 358 and 360. The reactive force of the streams or jets of fluid against the side of the vehicle 32 maintains the wash arm 200 in a predetermined spaced relationship with the side of the vehicle at all times during the longitudinal movement of the frame 56 relative to the vehicle as the vehicle is being washed and rinsed.

In view of the preceding remarks it is apparent that the automatic vehicle washing mechanism 52 is truly automatic since manual operations or functions are not required to wash the vehicle 32. The vehicle 32 is engaged only by sprays of water from a plurality of washing arms. The upper outer surface area of the vehicle 32 is washed by a stream or spray from nozzles 168 and 170 which are supported by wash arms 164 and 166. The wash arms 164 and 166 are positioned by a sensing assembly 70 relative to the upper surface of the vehicle to maintain the wash arms in a predetermined relationship with the vehicle so that the spray or stream of fluid from the nozzles is effective to wash the vehicle. The left side of the vehicle 32 is engaged by a stream or spray of fluid from nozzles 206 of a left side wash arm 202. The left side wash arm 202 is positioned relative to the left side of the vehicle 32 by a positioning assembly 270 which sensibly engages a left wheel 272 of the vehicle. The right side of the vehicle 32 is washed by a spray or stream of fluid 356 from nozzles 204 of a right side wash arm 200. The right side wash arm 200 is positioned in a predetermined spacial relationship relative to the vehicle 32 by a reactive force which results from the impinging of the stream 356 of fluid against the side of the vehicle. Since the stream 356 exerts a force directed inwardly against the side of the vehicle the substantially equal and opposite reactive force urges the right side wash arm 200 outwardly away from the side of the vehicle. It should be noted that even when the wash arm 200 is in its initial position, the nozzles 204 are spaced a slight distance away from the right side of the vehicle 32. This slight initial spacing of the nozzles 204 prevents the vehicle 32 from being damaged in the event that the water supply to the nozzles 204 is cut off during a washing operation.

A schematic illustration of control circuitry 400 for the vehicle washing unit 30 is illustrated in FIG. 21. The control circuitry 400 is connected by a pair of leads 402 and 404 to a suitable source of power. The control circuitry 400 includes three main subcircuit groups. A first subcircuit group is indicated at 406 in FIG. 21 and includes a plurality of memory or sequence control switches and slow release relays. The second subcircuit group is indicated at 408 and includes apparatus for controlling the motion of the wash frame 56 and the horizontal wash boom 60. The third and last subcircuit group is indicated at 410 and includes control apparatus associated with the control assembly 70 for regulating the movements of the wash frame 56 and wash boom 60. The slow release relays of the first subcircuit group 406 sequentially energize relays, designated E1, E2, E3 and E4 of the third subcircuit group 410. The relays have been designated E1 through E4 to indicate their respective association with the sensor units 88, 90, 100 and 102. The E relays of the third subcircuit group 410 in turn control the energization of the apparatus in the second subcircuit group 408 to regulate the motion of the wash frame 56 and wash boom 60 relative to a vehicle being washed.

A start switch 412 is mounted in the control mechanism 50 (see FIG. 2) and is connected to the power lines 402 and 404 by leads 414, 416 and 418. When the start switch 412 is actuated, by depositing a predetermined amount of money in the control unit 50, a first cycle of operation is begun by energizing a first pass or run relay R1 through a circuit including normally closed contacts 420 of an R2 relay. Energization of the R1 relay closes normally open contacts 422 of the R1 relay to hold the R1 relay energized over its own contacts. Energization of the R1 relay also closes contact 424, in the third subcircuit group 410, to connect the E1 and E2 relays to the power lines 402 and 404 through leads 426 and 428. Energization of the E1 relay connects a reversing starter 430, in the second subcircuit group 408, to the lead 428 and the power line 402 over circuitry including a lead 432 and normally open contacts 434 and normally open contacts 434 of the now energized E1 relay. It should be noted that the E1 relay is controlled by the sensor unit 88 and is deenergized to open contacts 434 when the transmission of radiant energy or light between the emitter or light source and receiver or photoelectric cell of the sensor unit 88 is blocked. The circuit for energizing the reversing starter 430 is completed by leads 436 and 438 which connect the reversing starter 430 to the power line 404. When the reversing starter 430 is energized, the frame drive motor 156 is energized to move the frame 56 rearwardly relative to a vehicle being washed (see FIGS. 4 and 5).

Energization of the E1 relay also opens normally closed contacts 444 of the second subcircuit group 408 to deenergize a reversing starter 446 which controls the energization of the wash arm drive motor 182. If the transmission of radiant energy between the emitter and receiver of the sensor unit 88 is blocked, the E1 relay is deenergized and the contacts 434 of the E1 relay return to their normal open position and rearward movement of the frame 56 is halted. Contemporaneously with the opening of the contacts 434, the contacts 444 are closed and the reversing starter 446 is energized. Energization of the reversing starter 446 energizes the motor 182 to move the wash boom 60 vertically upwards. The circuit for energizing the reversing starter 446 includes a lead 450 which connects the contacts 444 of the E1 relay to the lead 432, a lead 452 and the leads 436 and 438. A vertical limit switch 454 is provided in circuit for energizing the reversing starter 446 to limit the upward motion of the wash boom 60. In view of the foregoing description, it is apparent that when the E1 and R1 relays are energized the frame drive motor 156 is operated to move the frame 56 rearwardly relative to a vehicle being washed. Interruption of the transmission of radiant energy between the emitter and receiver of the sensor unit 88 by the vehicle being washed deenergizes the E1 relay and drive motor 156 to halt the rearward movement of the frame 56. The normally closed contacts 444 of the E1 relay then complete a circuit for energizing and reversing starter 446 to move the wash boom 60 upwardly relative to the vehicle being washed.

The E2 relay is energized contemporaneously with the E1 relay by the operation of the R1 relay. The operation of the E2 relay opens normally closed contacts 458 of the E2 relay in the second subcircuit group 408. The contacts 458 of the E2 relay are connected to normally open contacts 460 of the now energized R1 relay by a lead 462. The contacts 458 of the E2 relay are also connected to a reversing starter 464 by a lead 466. Energization of the reversing starter 464 causes the wash arm drive motor 182 to move the wash boom 60 downwardly relative to the vehicle being washed. The E2 relay is deenergized whenever the transmission of radiant energy between the emitter and receiver of the sensor unit 90 is not blocked by the vehicle 32 in the manner previously explained in connection with FIG. 3. Therefore, the reversing starter 464 is energized whenever the R1 relay is energized and the E2 relay is deenergized by the transmission of radiant energy or light to a receiver or photoelectric cell of the sensor unit 90 to move the wash boom 60 downwardly toward the upper surface of the vehicle 32.

From the foregoing remarks, it is apparent that actuation of the start switch 412 energizes the R1 relay to connect the relays E1 and E2, which are associated with the sensor units 88 and 90, with power lines 402 and 404. Energization of the E1 relay closes the normally open contacts 434 to energize the starter 430 and the wash frame drive motor 156 to move the frame 56 rearwardly relative to the vehicle being washed. The energization of the E1 relay opens normally closed contacts 444 to interrupt a circuit for energizing the reversing starter 446 to control the vertical movement of the wash boom 60. The E1 relay remains energized and the reversing starter 446 deenergized as long as radiant energy is transmitted between the emitter and receiver of the sensor unit 88. When the transmission of radiant energy between the receiver and emitter of the sensor unit 88 is blocked, the E1 relay is deenergized. The contacts 434 then open to interrupt the circuit for the starter 430. Contemporaneously therewith, the contacts 444 return to their normal closed position and the reversing starter 446 is energized to raise the wash boom 60 relative to the vehicle being washed. Energization of the E2 relay opens normally closed contacts 458 to deenergize the reversing starter 464 as long as the transmission of energy between the emitter and receiver of the sensor unit 90 is blocked. When radiant energy is transmitted between the emitter and receiver of the sensor unit 90, the E2 relay is deenergized, the contacts 458 are closed to energize the reversing starter 464 to move the wash boom 60 downwardly relative to the vehicle being washed. A limit switch 470 is connected in the circuit for energizing the reversing starter 464 to limit the downward movement of the wash boom 60.

A water flow control solenoid 474, of the second subcircuit group 408, is operated by the energization of the R1 relay to provide water for an initial rinsing of the car during the first pass or cycle of operation of the wash frame 56. The solenoid 474 is operated over a circuit including the contacts 460 of the R1 relay. The contacts 460 are connected by leads 462, 476, 478, and the normally closed contacts 480 of the deenergized R4 relay to the solenoid 474. The circuit for operating the solenoid 474 is completed by the leads 436 and 438 to the power line 404.

At the end of the first run or cycle of operation of the washing unit 30, a limit switch LS1, indicated at 484 in the first subcircuit group 406, is actuated from its normally open position to operate a R2 relay. The R2 relay is connected to the limit switch 484 by a lead 486 through the normally closed contacts of the deenergized R3 and R4 relays. Energization of the R2 relay opens the normally closed contacts 420 to deenergize the R1 relay. The R2 relay is held operated over its own normally open contacts 488. When the R1 relay is deenergized, the contacts 424 of the R1 relay in the third subcircuit group 410 return to their normal open position to deenergize the E1 and E2 relays and the control apparatus in the second subcircuit group 408 which was previously energized over normally open contacts of the E1 and E2 relays. Energization of the R2 relay closes normally open contacts 490 in the third subcircuit group 410 to energize the E3 and E4 relays which are associated with the sensor units 100 and 102 of the sensor combination 82.

Energization of the E3 relay closes normally open contacts 494 in the second subcircuit group 408 to energize a reversing starter 496 which is connected to the frame drive motor 156 to move the frame forwardly relative to the vehicle being washed. It should be noted that the reversing starter 430 energizes the motor 156 to drive the frame 56 rearwardly relative to the vehicle 32 while the reversing starter 496 reverses the field of the motor 156 to drive the frame 56 forwardly relative to the vehicle being washed. Energization of the E3 relay also opens normally closed contacts 496 in the second subcircuit group 408 to open a circuit for energizing the reversing starter 446. Energization of the E4 relay opens normally closed contacts 500, in the second subcircuit group 408, of the E4 relay which are connected to the power line 402 through normally open contacts 502 of the now energized R2 relay. The contacts 500 of the E4 relay are connected to the reversing starter 464 which is associated with the wash arm drive motor 182. Thus, on the second cycle of operation energization of the R2 relay results in the closing of the normally open contacts 490 to energize the E3 and E4 relays. The E3 and E4 relays are associated with the sensor units 100 and 102 in much the same manner as the E1 and E2 relays are associated with the sensor units 88 and 90. Therefore, the E3 relay is energized and the wash frame 56 is moved forwardly as long as radiant energy is transmitted between the receiver and emitter of the sensor unit 100. When the E3 relay is deenergized the forward movement of the wash frame is halted and the wash boom is moved upwardly. The E4 relay, on the other hand, is energized as long as the transmission of radiant energy between the emitter and receiver of the sensor unit 102 is blocked. Of course, when the E4 relay is deenergized, the wash boom 60 is moved downwardly relative to the vehicle being washed.

The vehicle was rinsed or wetted during the first cycle of operation of the vehicle washing mechanism 52 by operating the flow control solenoid 474. On the second cycle of operation, the flow control solenoid 474 is operated over normally open contacts 506 in the second subcircuit group 408 of the R2 relay. In addition, the detergent control solenoid 510, in the third subcircuit group 410, is energized on the second cycle of operation by a closing of normally open R2 relay contacts 512. This connects a source of liquid detergent under pressure to the nozzles of the wash arms for mixing with the water and spraying onto the vehicle to cleanse the vehicle.

As the frame 56 approaches the forward end of the vehicle, the second cycle of operation is ended and a limit switch LS2, indicated at 516 in the first subcircuit group 406, is actuated to operate the R3 relay. Operating the R3 relay opens the normally closed relay contacts 518 to release the R2 relay which was previously held energized over a circuit including the contacts 518. Operation of the R3 relay closes normally open contacts 520 to maintain the R3 relay in an operated condition. Operation of the R3 relay also closes normally open contacts 524, in the third subcircuit group 410, to energize the E1 and E2 relays which are associated with the sensor units 88 and 90. As was previously explained in connection with the energization of the R1 relay, energization of the E1 relay closes normally open contacts 434 to energize the reversing starter 430 and move the frame 56 rearwardly relative to a vehicle being washed. Contemporaneously with the closing of the contacts 434, the contacts 444 are opened so that the reversing starter 446 is energized only when the transmission of radiant energy between the emitter and receiver of the sensor unit 88 is blocked. Similarly, contacts 458 of the now energized E2 relay are opened so that the reversing starter 464 is energized only when radiant energy is transmitted between the emitter and receiver of sensor unit 90. The solenoid 474 is again actuated, by a closing of contacts 528 of the R3 relay, to rinse off the detergent which was applied to the vehicle on the second cycle of operation of the wash unit 30.

At the end of the third run or cycle, the LS1 limit switch 484 of the first subcircuit group 406 is again actuated. Actuating the LS1 limit switch on the third cycle of operation energizes the R4 relay over a circuit including the limit switch 484, leads 530 and 532, and normally closed contacts 536 and 538 of the now deenergized R2 and R1, and the now released LS2 limit switch contacts 540. On the first cycle of operation of the wash unit 30, actuation of the LS1 limit switch 484 energized the R2 relay over a circuit including the normally closed contacts 518 of the R3 relay. Actuation of the limit switch 484 at the end of the third cycle of operation does not energize the R2 relay since the R3 relay is energized and the normally closed contacts 518 are open to break the circuit for energizing the R2 relay. Thus, the same limit switch 484 is utilized to control the first subcircuit group 406 at the end of the first and third cycles of operation of the wash unit 30.

Energization of the R4 relay opens normally closed contacts 504 of the R4 relay to deenergize the R3 relay. It should be noted that normally closed contacts 546 of the R4 relay are also opened contemporaneously with the contacts 504 of the R4 relay to prevent the R2 relay from being energized. The R4 relay is held in an energized condition over its own normally opened contacts 550. Energization of the R4 relay also closes contacts 554, in the third subcircuit group 410, to energize the E3 and E4 relay of the sensor combination 82. As previously explained, energization of the E3 and E4 relays closes contacts in the second subcircuit group 408 to control the movement of the frame 56 and wash boom 60 as the frame is moved forwardly relative to the vehicle being washed. Energization of the R4 relay also closes contacts 556 to provide a circuit for energizing the starter 464.

In a preferred embodiment of the invention, the water flow control solenoid 474 is not energized on the fourth run or cycle of the washing unit 30 due to an opening of the normally closed contacts 480 of the now energized R4 relay. Thus, the fourth run or cycle of operation of the washing unit merely returns the frame to its initial position at the forward end of the vehicle 32. As the frame reaches its initial position the LS2 limit switch 516 is actuated and normally closed contacts 540 are opened to deenergize the R4 relay and shut down the washing unit 30. It will be apparent to those skilled in the art that the contacts 480 of the R4 relay could be omitted in which case the fourth cycle or run of the wash unit 30 would result in a second rinse being applied to the vehicle.

In the preferred embodiment of the invention the vehicle 32 is driven forwardly into the wash unit 30 and, at the end of the washing operation, driven rearwardly out of the wash unit 30. When the vehicle is moved in this manner it is particularly advantageous to begin and end the washing operation with the frame 56 located at a forward end portion of the wash unit 30. Positioning the frame 56 forwardly at the end of the washing operation insures that the frame is not damaged due to carelessness on the part of the driver of the washed vehicle in backing the vehicle out of the wash unit 30. A forward positioning of the frame 56 is also preferred since if, for some unforeseen reason, the sensor assembly 70 should malfunction and the wash boom 60 is not raised relative to the vehicle 32 to the top of the frame 56 at the end of the washing operation, the wash boom 60 would not block the rearward exit of the automobile 32. However, the vehicle could, if desired, be backed out of the wash unit 30 through the frame 56 since the wash boom 60 is normally raised to the top of the frame at the end of the washing operation under the action of the sensor assembly 70.

In a second embodiment (not shown) of the invention, doors or passageways are provided at opposite ends of the wash unit 30 so that the vehicle can be driven through the wash unit. A vehicle is driven forwardly into the wash unit through a first door in one end of the wash unit and forwardly out of the wash unit through second door in the opposite end of the wash unit. With this drive through arrangement, it is contemplated that the wash frame 56 will be initially placed at the forward end of the wash unit, as the case in the present embodiment, and will be positioned at the rear of the wash unit at the end of the washing operation. The fourth cycle or run is omitted from the washing operation, so that the frame is located at the rear of the vehicle. The vehicle can then be driven forwardly out of the wash unit without endangering the equipment due to careless driving.

It is contemplated that in certain operations a plurality of stationary frames 56 will be mounted with a movable wash boom guided by sensor assemblies, similar to the sensor assembly 70, and the vehicle will be moved relative to the series of frames. As the vehicle is moved relative to the frames, the wash boom will be raised and lowered to maintain spray nozzles in a predetermined relationship with the automobile. It should be understood that with such an operation a stationary frame will have to be provided for each cycle of operation, that is one frame for each of the rinsing operations and one frame for each of the washing operations.

For purposes of affording a complete understanding of the invention, it is advantageous now to provide a functional description of the mode in which the preferred embodiment of the washing unit operates. A vehicle 32 will be driven into the washing unit 30 and the sliding door 48 closed. Coins of a suitable denomination will be inserted into coin actuated control mechanism 50 to actuate a start switch 412, or if desired the start switch 412 can be actuated by an attendant. Actuation of the start switch 412 will energize control circuitry 400 to move the wash frame 56 rearwardly relative to the vehicle 32 under control of the sensor units 88 and 90. As the frame 56 is moved rearwardly the disc 284 on the positioning arm 278 will engage the tire or wheel 272 of the vehicle 32 to position the side wash arm 202 relative to the vehicle. As the side wash arm 202 is being positioned, rinse water will be flowing from the nozzles of the wash boom 60 and both of the side wash arms 202 and 200. The wash arms 164 and 166 of the wash boom 60 will be moved vertically relative to the vehicle under the control of the sensor assembly 70 as the frame is moved rearwardly. In addition, the side wash arm 200 will be moved outwardly relative to the vehicle to a normal or spray position by a reactive force of the water from the nozzles 204.

It should be noted that the wash boom 60 and the wash arm 200 are positioned relative to the vehicle without engaging the vehicle with a solid object. The wash boom 60 is positioned in response to the control assembly 70 which is spaced apart from the vehicle and senses the vertical contour of the vehicle by transmitting radiant energy between a plurality of sensor units. The side wash arm 200 is positioned relative to the vehicle by the reactive force of the sprayed liquid from the nozzles 206 on the side of the vehicle. The side wash arm 202, on the other hand, is positioned relative to the vehicle by the engagement of the positioning arm 278 with a wheel of the vehicle. Of course, the side wash arm 202 could, if desired, be positioned relative to the vehicle with a sensing unit, similar to the sensing units 88 and 90, or it could be positioned relative to the vehicle by reactive force of the spray from the nozzles 206. However, due to the large variation in the width of vehicles, the side wash arm 202 is preferably positioned relative to the vehicle by the positioning arm 278.

As the frame 56 is moved rearwardly relative to the vehicle a rinsing solution will be sprayed onto the vehicle. At the end of the first or initial rinsing cycle or run of the frame 56 a limit switch 484 will be engaged to actuate the first subcircuit group 406 to energize a second sensor combination 82 for the forward movement of the frame 56 on the second or wash cycle or run. The frame 56 will then be moved forwardly under the control of the sensor units 100 and 102 and both soap and water will be sprayed from the nozzles of the side wash arms 200 and 202 and the wash boom 60. At the end of the second or wash cycle a second limit switch 516 is actuated and a third or final rinsing cycle or run is begun. During the final rinse cycle the sensor units 88 and 90 sense the vertical contour of the vehicle and position the wash boom 60 relative to the vehicle while controlling the rearward movement of the frame 56. At the end of the third cycle or final rinse, the limit switch 484 is again actuated and the frame 56 is moved forwardly relative to the vehicle to its initial position. As the frame is moved forward of the vehicle, the release lever or arm 332 on the pawl 330 is actuated by the protuberance 334 to release the positioning arm 278 for movement back to its initial position. Of course, the side wash arm 202 moves inwardly to its initial position when the positioning arm 278 is released. The wash frame 56 has now been returned to its initial position forwardly of the washed vehicle 32. The door 48 will then be opened and the vehicle 32 backed out of wash unit 30.

The control assembly 70 has been disclosed in connection with a wash boom 60 for washing the vehicle 32. The sensor assembly 70 detects the elevational contour of the vehicle 32 and maintains the wash boom 60 substantially in a predetermined relationship relative to the vehicle 32 while the vehicle is being washed. Of course, the sensor unit can be used for positioning elements other than a wash boom relative to irregular objects other than an automobile. Thus, the control assembly 70 could be used for positioning paint spray guns relative to an object to be painted as the object is moved on an assembly line past the sensor assembly. In addition, it will be apparent to those skilled in the art that the side wash arms 200 and 202 can, if desired, be positioned relative to a vehicle with sensor units similar to the sensor units 88 and 90. However, due to the substantial regularity of the side surfaces of an automobile and the large variations in width of automobiles, it has been found to be advantageous to position the side arm 202 by engaging the wheel 272 of the automobile with the positioning arm 278. It should be noted that the wheel 272, being formed of rubber, will not be scratched or permanently marked by engagement with the positioning arm 278 as would a painted finish of a body of an automobile. It is contemplated that the positioning arm 278 could, if desired, be eliminated and the side wash arm 202 positioned by reactive force between fluid flowing from the nozzles 202 and the vehicle in much the same manner as in which the side wash arm 200 is positioned. Therefore, while a particular embodiment of the invention has been shown, it should be understood, of course, that the invention is not limited thereto since many modifications may be made; and it is contemplated to cover by the appended claims any such modifications as fall within the true spirit and scope of the invention.

I claim:

1. Apparatus for washing a vehicle, said apparatus comprising: horizontally disposed fluid dispensing means for spraying fluid under pressure onto said vehicle and supported for vertical movement; drive means connected to said fluid dispensing means for providing relative movement between said fluid dispensing means and a vehicle in the vertical direction; and sensing means operably connected with said drive means for detecting the elevational relationship between said fluid dispensing means and the vehicle, said sensing means including a first upper photoelectric unit and a second lower photoelectric unit spaced a predetermined distance from said first photoelectric unit, each said photoelectric unit including means emitting a beam of radiant energy and detector means, said units being operably connected to said drive means such that the reception of radiant energy by said second upper photoelectric unit energizes said drive means to lower said fluid dispensing means, and the disruption of the reception of radiant energy by said first photoelectric unit will energize said drive means to raise the fluid dispensing means, whereby a predetermined relationship between said fluid dispensing means and the vehicle is maintained during relative movement between said fluid dispensing means and the vehicle in the horizontal direction.

2. Apparatus as defined in claim 1 wherein said drive means include: a first motor for moving the fluid dispensing means vertically and to which said photoelectric units are operably connected; and a second motor for moving said fluid dispensing means horizontally relative to said vehicle, said first, upper photoelectric unit being operably connected to said second motor, such that when radiant energy is received by said unit, said second motor is energized, with the disruption of the reception of radiant energy deenergizing said second motor in conjunction with the energization of said first motor to raise the fluid dispensing means.

3. Apparatus as defined in claim 1 wherein said fluid dispensing means include a plurality of nozzles carried by a horizontally disposed wash arm from which fluid is sprayed under pressure onto the vehicle, and said drive means include a motor for moving said wash arm vertically relative to the vehicle in response to said sensing means.

4. Apparatus as defined in claim 1 wherein said drive means include a first motor for moving said fluid dispensing means vertically relative to the vehicle and a second motor for moving said fluid dispensing means horizontally relative to the vehicle.

5. Apparatus as defined in claim 1 wherein said apparatus further includes vertically disposed fluid dispensing means for spraying fluid onto the sides of the vehicle.

6. Apparatus as defined in claim 5 wherein said drive means include means operably connected to both said horizontally and vertically disposed fluid dispensing means to provide for longitudinal movement thereof relative to the vehicle.

7. Apparatus as defined in claim 5 wherein said sensing means further include detecting means mounted for engagement by the vehicle to sense the location of the vehicle relative to a reference point, said detecting means being operably connected to said vertically disposed fluid dispensing means to maintain a predetermined spaced relationship between said fluid dispensing means and the vehicle.

8. Apparatus as defined in claim 7 further including latch means to maintain said vertically disposed fluid dispensing means in said spaced relationship to the vehicle when the engagement of said detecting means with the vehicle is discontinued.

9. Apparatus for washing a vehicle, said apparatus comprising: horizontally disposed fluid dispensing means for spraying fluid under pressure onto said vehicle; drive apparatus connected to said fluid dispensing means for providing relative movement between the vehicle and said fluid dispensing means in both the horizontal and vertical directions; sensing means for detecting the elevational relationship between said fluid dispensing means and the vehicle, said sensing means being operably connected to said drive apparatus to control said relative movement, said sensing means including first and second sensor units carried by said horizontally disposed means, with said second sensor unit being disposed vertically below said first unit, each said unit including a source of radiant energy and detector means for receiving said emitted energy, said first sensor unit being operably connected with the drive apparatus to produce relative downward movement of said horizontally disposed means upon the reception of radiant energy, and said first sensor unit deenergizing said drive apparatus upon the disruption of said reception, said second sensor unit being operably coupled with said drive apparatus such that upon the reception of radiant energy relative longitudinal movement between said vehicle and said horizontally disposed means is effected, with the disruption of reception of radiant energy by said second unit terminating said relative longitudinal movement and effecting relative vertical movement of said horizontally disposed means in a direction away from said vehicle.

10. Apparatus as defined in claim 9 wherein said drive apparatus include both horizontal and vertical drive motors for effecting said longitudinal and transverse movement.

11. Apparatus as defined in claim 9 and further including vertically disposed fluid dispensing apparatus for spraying fluid onto the sides of the vehicle, said drive apparatus being operatively coupled to said vertically disposed fluid dispensing means to effect longitudinal movement thereof relative to the vehicle.

12. Apparatus as defined in claim 11 further including detecting means for engagement by the vehicle to sense the position of the sides thereof relative to a reference location, said detecting means being operatively coupled to said vertically disposed fluid dispensing means to provide a predetermined spaced relationship between said vertically disposed fluid dispensing means and the vehicle.

13. Vehicle washing apparatus comprising: a first group of horizontally disposed nozzles supported for vertical movement relative to a vehicle; a second group of nozzles disposed vertically for applying washing liquid to a first side surface of the vehicle; a third group of nozzles disposed vertically for applying liquid to a second side surface of the vehicle; drive apparatus including first drive means connected to said groups of nozzles for moving them longitudinally of said vehicle and second drive means connected to said first group of nozzles for moving said group vertically relative to the vehicle; and sensor means for controlling the operation of said washing apparatus, said sensor means including first and second sensor units carried by said first group of nozzles with said second sensor unit being disposed vertically below said first unit, each said unit including a source of radiant energy and detector means for receiving said emitted energy, said first sensor unit being operably connected with the second drive means to produce downward movement of said first group of nozzles upon the reception of radiant energy, and said first sensor unit deenergizing said second drive means upon the disruption of said reception, said second sensor unit being operably coupled with said first drive means such that upon the reception of radiant energy longitudinal movement of said group of nozzles is effected, with the disruption of reception of radiant energy by said second unit terminating said longitudinal movement and effecting relative vertical movement of said first group of nozzles in a direction away from said vehicle.

14. Vehicle washing apparatus as defined in claim 13 wherein said third group of nozzles is supported for movement transversely of said vehicle in the vertical plane.

15. Vehicle washing apparatus as defined in claim 14 wherein said sensor means further include an additional sensing unit mounted for engagement by the vehicle, said additional sensing unit being operably coupled with said third group of nozzles for moving said group into a predetermined spaced relationship to said second side surface of the vehicle.

16. Apparatus for use in an automated vehicle washing system, said apparatus including: horizontally disposed means for performing one step of a vehicle washing operation; drive apparatus associated with said horizontally disposed means and said vehicle for providing relative movement between said vehicle and said fluid dispensing means in both the horizontal and vertical directions; and sensing means for detecting the elevational relationship between said fluid dispensing means and the vehicle to control said relative movement both longitudinally and vertically of said vehicle, said sensing means including first and second sensor units carried by said horizontally disposed means, with said second sensor unit being disposed vertically below said first unit, each said unit including a source of radiant energy and detector means for receiving said emitted energy, said first sensor unit being operably connected with the drive apparatus to produce relative downward movement of said horizontally disposed means upon the reception of radiant energy, and said first sensor unit deenergizing said drive apparatus upon the disruption of said reception, said second sensor unit being operably coupled with said drive apparatus such that upon the reception of radiant energy relative longitudinal movement between said vehicle and said horizontally disposed means is effected, with the disruption of reception of radiant energy by said second unit terminating said relative longitudinal movement and effecting relative vertical movement of said horizontally disposed means in a direction away from said vehicle.

17. Apparatus for washing a vehicle, said apparatus comprising: horizontally disposed fluid dispensing means for spraying fluid under pressure onto said vehicle; drive apparatus connected to said fluid dispensing means for providing relative movement between the vehicle and said fluid dispensing means in both the horizontal and vertical directions; sensing means for detecting the elevational relationship between said fluid dispensing means and the vehicle, said sensing means being operably connected to said drive apparatus to control said relative movement so as to maintain within predetermined limits a spacial relationship between said fluid dispensing means and the vehicle during said relative movement; said drive apparatus including a first motor for moving said fluid dispensing means vertically relative to the vehicle and a second motor for effecting horizontal movement of said fluid dispensing means relative to the vehicle; said sensing means including a first sensor unit connected to said first motor and a second sensor unit connected to both said first and second motors, said first sensor unit being operative to signal said first motor to control at least partially the vertical movement of said fluid dispensing means relative to the vehicle, and said second sensor unit being operative to signal both said first and said second motors to control at least partially both the vertical and horizontal movements of said fluid dispensing means relative to the vehicle.